United States Patent
Takahashi et al.

(10) Patent No.: US 10,606,255 B2
(45) Date of Patent: Mar. 31, 2020

(54) PLANT MONITOR AND CONTROL SYSTEM

(71) Applicant: Mitsubishi Electric Corporation, Chiyoda-ku, Tokyo (JP)

(72) Inventors: Koichi Takahashi, Tokyo (JP); Kanako Homizu, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 310 days.

(21) Appl. No.: 15/111,521

(22) PCT Filed: Mar. 25, 2014

(86) PCT No.: PCT/JP2014/058180
§ 371 (c)(1),
(2) Date: Jul. 14, 2016

(87) PCT Pub. No.: WO2015/145559
PCT Pub. Date: Oct. 1, 2015

(65) Prior Publication Data
US 2016/0334784 A1    Nov. 17, 2016

(51) Int. Cl.
G05B 15/00 (2006.01)
G05B 23/02 (2006.01)
G09G 5/00 (2006.01)
G06F 3/048 (2013.01)
G06F 3/14 (2006.01)
G06F 3/0484 (2013.01)
(Continued)

(52) U.S. Cl.
CPC ....... G05B 23/0272 (2013.01); G01C 21/206 (2013.01); G06F 3/048 (2013.01);
(Continued)

(58) Field of Classification Search
CPC .............. G05B 13/0205; G05B 19/409; G05B 2219/23125; G05B 2219/23131;
(Continued)

(56) References Cited

U.S. PATENT DOCUMENTS 5,969,697 A * 10/1999 Tani ................... G06F 3/038
                                                  345/2.1
10,114,543 B2 * 10/2018 Dand .................. G06F 3/0486
(Continued)

FOREIGN PATENT DOCUMENTS

JP    61-226896 A    10/1986
JP    1-270096 A    10/1989
(Continued)

OTHER PUBLICATIONS

Office Action (Notification of Reason for Refusal) dated Aug. 23, 2016, by the Japanese Patent Office in corresponding Japanese Patent Application No. 2016-509659 and English translation of the Office Action. (9 pages).
(Continued)

Primary Examiner — Zhipeng Wang
(74) Attorney, Agent, or Firm — Buchanan Ingersoll & Rooney PC

(57) ABSTRACT

In a plant monitor and control system which includes a large display which displays plant monitor and control information items, and a navigation display terminal by which a touch input operation can be performed, an overall display screen of the large display is displayed on the navigation display terminal, and the display screen of the large display is expanded and displayed on the navigation display terminal in a state where the display screen of the large display, which is displayed on the navigation display terminal, is a base point, and minute information items of devices, which are displayed in a display screen of the navigation display terminal, are displayed.

11 Claims, 11 Drawing Sheets

(51) Int. Cl.
*G06F 3/0481* (2013.01)
*G01C 21/20* (2006.01)
*G06F 3/0482* (2013.01)
*G06F 3/0488* (2013.01)

(52) U.S. Cl.
CPC .......... *G06F 3/0481* (2013.01); *G06F 3/0482* (2013.01); *G06F 3/0488* (2013.01); *G06F 3/04845* (2013.01); *G06F 3/1454* (2013.01); *G09G 5/00* (2013.01); *G06F 3/1423* (2013.01); *G06F 3/1446* (2013.01); *G06F 2203/04804* (2013.01); *G06F 2203/04806* (2013.01)

(58) Field of Classification Search
CPC ........... G05B 2219/23152; G05B 2219/23157; G05B 2219/31103; G05B 2219/31104; G06F 3/038; G06F 3/04812; Y10S 715/978
See application file for complete search history.

(56) References Cited

U.S. PATENT DOCUMENTS

| | | | | |
|---|---|---|---|---|
| 2008/0065243 A1* | 3/2008 | Fallman | ............... | G05B 19/409 700/83 |
| 2011/0224806 A1* | 9/2011 | Yamada | ............. | G05B 13/0205 700/17 |
| 2013/0103446 A1* | 4/2013 | Bragdon | ............ | G06Q 10/1095 705/7.15 |
| 2014/0152591 A1* | 6/2014 | Odakura | ............. | G06F 3/04883 345/173 |
| 2014/0173530 A1* | 6/2014 | Mesguich Havilio | ...................... | G06F 3/04883 715/863 |

FOREIGN PATENT DOCUMENTS

| | | | |
|---|---|---|---|
| JP | 2-194496 A | | 8/1990 |
| JP | 7-281853 A | | 10/1995 |
| JP | 07281853 A | * | 10/1995 |
| JP | 7-334230 A | | 12/1995 |
| JP | 11-7316 A | | 1/1999 |
| JP | 11-249729 A | | 9/1999 |
| JP | 2006-244138 A | | 9/2006 |
| JP | 2010-231291 A | | 10/2010 |
| JP | 2012-69026 A | | 4/2012 |

OTHER PUBLICATIONS

*International Search Report (PCT/ISA/210) dated May 20, 2014, by the Japanese Patent Office as the International Searching Authority for International Application No. PCT/JP2014/058180.

* cited by examiner

PLANT MONITOR AND CONTROL SYSTEM

TECHNICAL FIELD

The present invention relates to a plant monitor and control system in which monitor and control functions are integrated in a central monitor and control room in order to intensively monitor a plant by a plurality of operators.

BACKGROUND ART

In a conventional system in which a large display and a plurality of handy individual information terminals (monitor and control terminals) are used, a cursor pointer of the handy individual information terminal is displayed on the large display, and a referential information item is displayed on the individual information terminal by using the cursor pointer on the large display ((for example, refer to Patent Document 1).

CONVENTIONAL ART DOCUMENT

Patent Document

Patent Document 1: Japanese Laid-Open Patent Publication No. H11-249729

SUMMARY OF THE INVENTION

Problems to be Solved by the Invention

In a conventional operation cooperation of a plurality of operators and a display of a cooperation information item on an individual information terminal, in which a large display is mainly used, information contents on the large display are information items which are required to be shared by the plurality of operators, and a minute level is not high, so that it is not sufficient that a referential item is displayed in accordance with the information contents on the large display. Moreover, although the operator operates a handy individual information terminal in a state where a display information item on the large display is a base point, a screen displayed on the large display is different from a screen displayed on the individual information terminal, so that an intuitive operation cannot be performed. Moreover, in a nuclear power plant or the like, in which an important monitor and control operation is performed in order to maintain safety, when it is required that an important monitor information item is constantly displayed on a large display, a screen display on the large display is modified in accordance with an operation of the individual information terminal in a conventional system, so that the operator cannot correspond to the screen display. Moreover, a plant operation is performed by the handy individual information terminal of the operator, so that there has been a problem in that a supervisor cannot easily estimate that each of the operators operates any portion. Moreover, in the individual information terminal which is applied to a plant monitor operation, reliability is maintained by operating a fixed function corresponding to a plant operation, so that many different information items cannot be displayed.

The present invention has been made to solve above-described problems, and an overall display screen of a large display is displayed on an auxiliary information display terminal, and an operator can easily display a display screen for an operation, which is required by the operator, with respect to an operation which is started in a state where the displayed display screen of the large display is a base point, without modifying the display screen of the large display. Moreover, an object of the invention is to provide a plant monitor and control system in which information items for an area, in which the operator performs an operation, can be shared by a plurality of operators.

Means for Solving Problems

A plant monitor and control system of the present invention includes a large display which displays plant monitor and control information items; a navigation display terminal by which a touch input operation can be performed; a data server in which the plant monitor and control information items are stored; a large shared information display unit by which the shared plant monitor and control information items are displayed on the large display so as to share the plant monitor and control information items by a plurality of operators; a navigation display unit by which the information items, which are displayed on the large display, are displayed on the navigation display terminal, and referential auxiliary information items, which are required for an operation, are displayed; and a monitor and control information provision unit by which the plant monitor and control information items are provided from the data server to the large shared information display unit and the navigation display unit; wherein an overall display screen of the large display is displayed on the navigation display terminal, and the display screen of the large display is expanded and displayed on the navigation display terminal in a state where the display screen of the large display, which is displayed on the navigation display terminal, is a base point, and when it is judged that an expansion scaling factor is reached to a predetermined maximum value, minute information items of devices, which are displayed in a display screen of navigation display terminal, are displayed.

Effects of the Invention

In a plant monitor and control system according to the present invention, an overall display screen of a large display is displayed on navigation display terminal, and the display screen of the large display is expanded and displayed on the navigation display terminal in a state where the displayed display screen of the large display is a base point, and when it is judged that an expansion scaling factor is reached to a predetermined maximum value, minute information items of devices, which are displayed in a display screen of the navigation display terminal, are displayed, so that an intuitive operation can be performed in a state where the displayed display screen of the large display is a base point, and an operator can obtain a high minute information item which cannot be obtained by the display screen of the large display, in which the information item is shared by a plurality of operators. Moreover, a required information item can be individually displayed on the handy navigation display terminal without modifying the display screen of the large display. Thereby, the accuracy of the plant monitor is improved, and the high reliability of the system can be maintained.

An aim, a characteristic, a viewpoint, and an effect of the present invention, which are not described in the above explanations, will be cleared by the following detail explanations for the present invention in reference to drawings.

MODE FOR CARRYING OUT THE INVENTION

Embodiment 1

Figure 1:
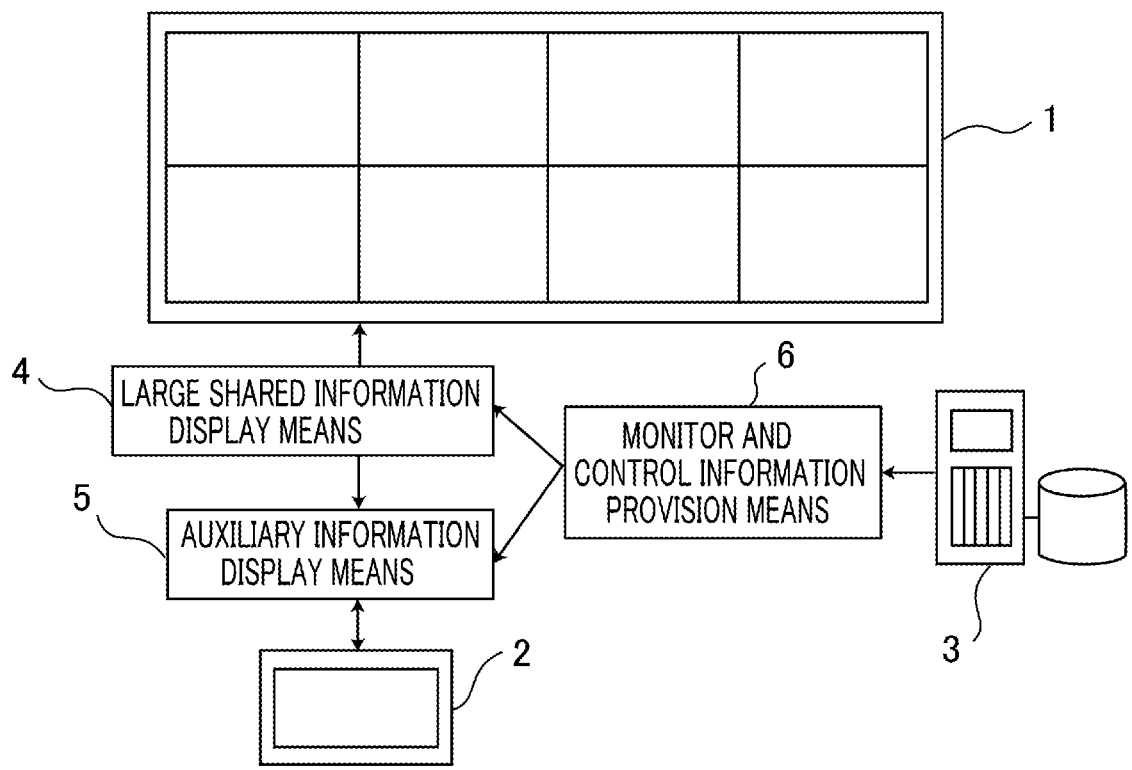
FIG. 1 is an overall schematic diagram illustrating a plant monitor and control system according to Embodiment 1 of the present invention.

Hereinafter, a plant monitor and control system according to Embodiment 1 of the present invention will be explained in reference to FIG. 1, FIG. 2, FIG. 3, and FIG. 4. FIG. 1 is an overall schematic diagram illustrating the plant monitor and control system according to Embodiment 1. In FIG. 1, the plant monitor and control system includes a large display 1 which displays plant monitor and control information items; a handy auxiliary information display terminal 2, such as a mobile terminal, by which a touch input operation can be performed; a data server 3 in which the plant monitor and control information items are stored; a large shared information display means 4 by which the shared plant monitor and control information items are displayed on the large display 1 so as to share the plant monitor and control information items by a plurality of operators; an auxiliary information display means 5 by which the information items, which are displayed on the large display 1, are displayed on the auxiliary information display terminal 2, and referential auxiliary information items, which are required for an operation, are displayed; and a monitor and control information provision means 6 by which the plant monitor and control information items are provided from the data server 3 to the large shared information display means 4 and the auxiliary information display means 5.

Figure 2:
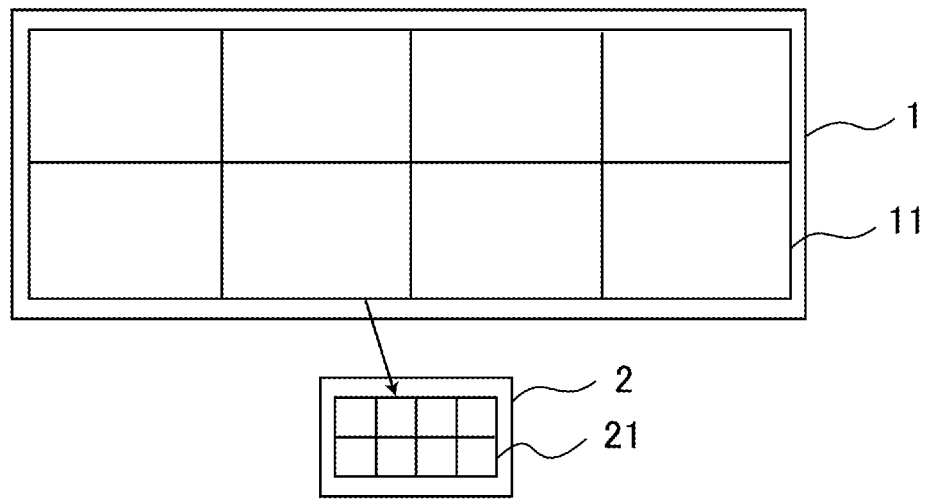
FIG. 2 is a diagram illustrating a relation between a display screen of a large display and a display screen of an auxiliary information display terminal, in which an overall screen is displayed, according to Embodiment 1.
Figure 3:
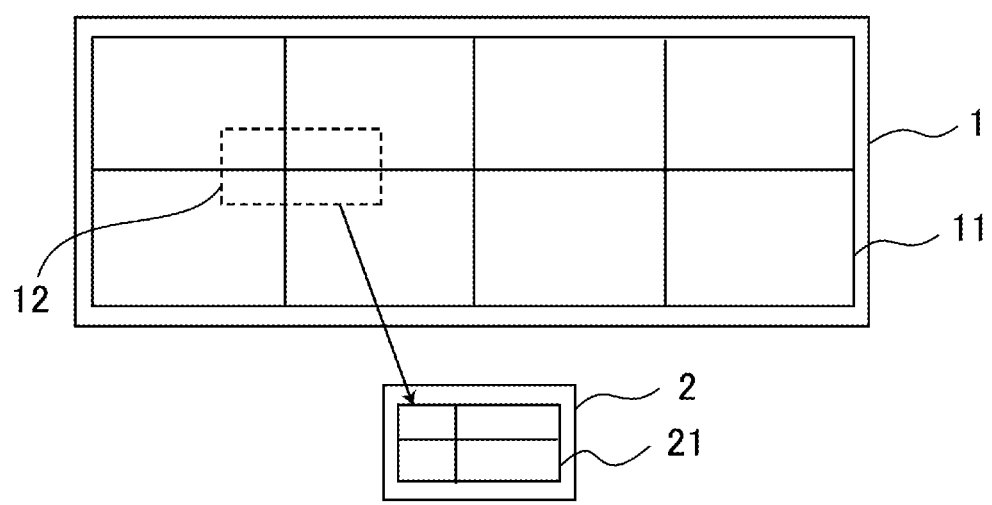
FIG. 3 is a diagram illustrating a relation between a display screen of the large display and a display screen of the auxiliary information display terminal, in which a partial screen is displayed, according to Embodiment 1.

FIG. 2 and FIG. 3 are diagrams illustrating a relation between a display screen of the large display 1 and a display screen of the auxiliary information display terminal 2. In FIG. 2, a relation between a display screen 11 of the large display 1 and a display screen 21 of the auxiliary information display terminal 2 is illustrated, and a state, in which the overall display screen 11 of the large display 1 is displayed on the display screen 21 of the auxiliary information display terminal 2, is illustrated. In FIG. 3, a part of the display screen 11 of the large display 1 is displayed on the display screen 21 of the auxiliary information display terminal 2, and a screen area 12 of the large display 1 is displayed on the auxiliary information display terminal 2.

Hereinafter, an operation of the plant monitor and control system according to Embodiment 1 will be explained. In Embodiment 1, the overall display screen of the large display 1 can be displayed on the auxiliary information display terminal 2, and monitor information items can be obtained on the auxiliary information display terminal 2 in a state where the display screen of the large display 1, which is displayed on the auxiliary information display terminal 2, is a base point. In this case, information items at a high minute level can be individually obtained on the auxiliary information display terminal 2 without modifying the display screen of the large display 1.

Figure 4:
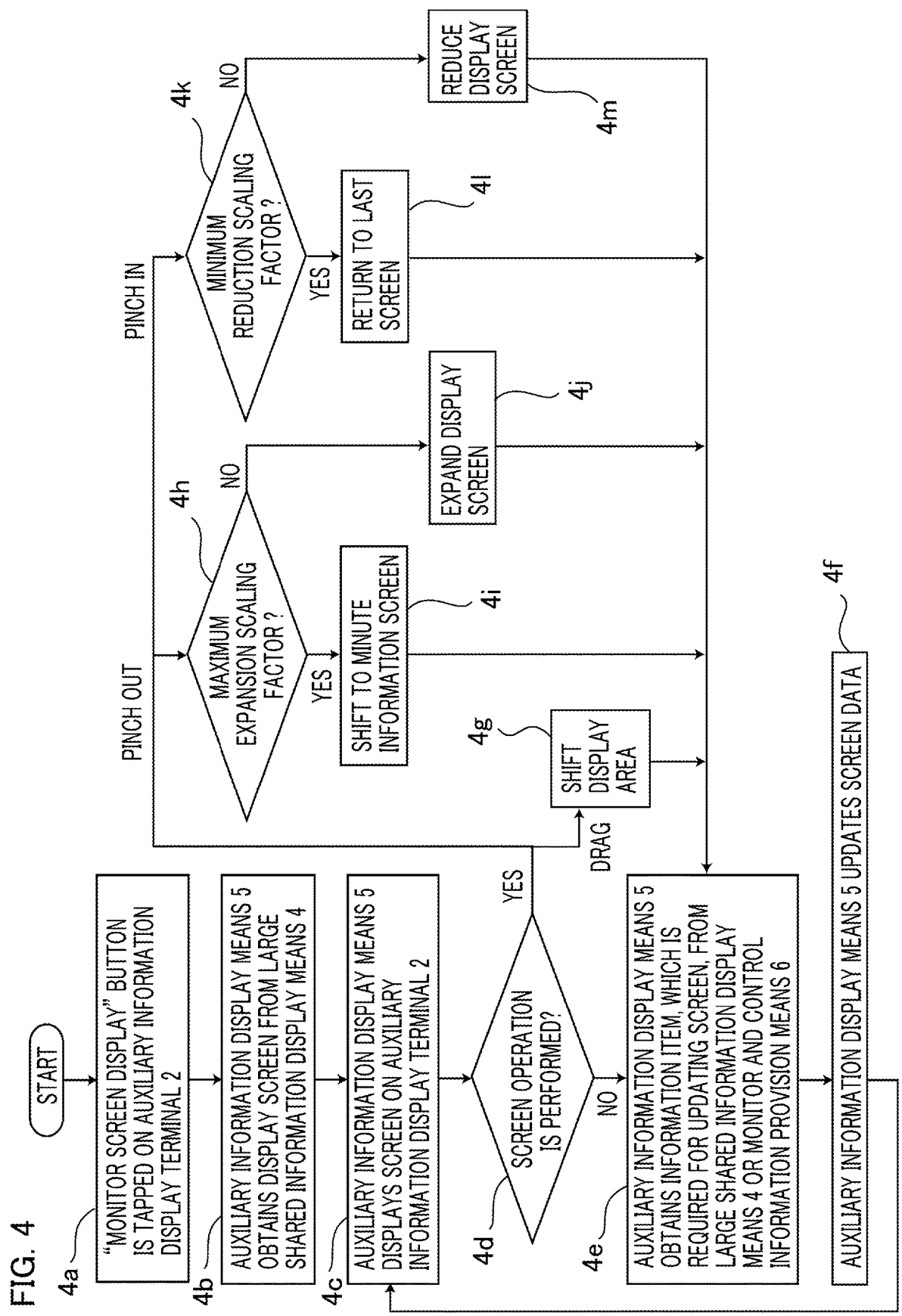
FIG. 4 is a flowchart for explaining an operation of the plant monitor and control system according to Embodiment 1.

FIG. 4 is a flowchart for explaining an operation of the plant monitor and control system according to Embodiment 1. The plant monitor and control information items, which are obtained from the data server 3 by the monitor and control information provision means 6, are displayed on the large display 1 by the large shared information display means 4. In order to display an information item, which is required to be minutely checked in information items displayed on the large display 1, on the auxiliary information display terminal 2, an operator performs an operation for obtaining a display screen on the large display 1, for example, by tapping "monitor screen display" menu button on the auxiliary information display terminal 2 (step 4a). In addition, a symbol indicated on the flowchart represents a step, and the symbol similarly represents the step in the following description. When the auxiliary information display means 5 receives a requirement for displaying a screen of the large display 1 from the auxiliary information display terminal 2, the auxiliary information display means 5 obtains the display screen 11, which is displayed on the large display 1, from the large shared information display means 4 (step 4b).

The overall display screen 11, which is displayed on the large display 1, is displayed on the display screen 21 of the auxiliary information display terminal 2 in accordance with a screen size of the auxiliary information display terminal 2 (step 4c and FIG. 2). After a screen display operation is terminated, the auxiliary information display means 5 judges whether a screen operation is performed or not performed on the auxiliary information display terminal 2 (step 4d). When the screen operation is not performed, the auxiliary information display means 5 obtains the screen information item from the large shared information display means 4 or the monitor and control information provision means 6, and updates data, and displays the screen at a constant period (step 4e, step 4f, and step 4c).

In order to obtain an objective display area, when the operator performs a drag operation (a finger is slid while a screen is pushed) in a state where the displayed display screen of the large display 1 is a base point, the auxiliary information display means 5 obtains the required information items (step 4e), and updates and displays the screen data (step 4f and step 4c) in order to shift the display area (step 4g). In addition, in this case, the display screen on the large display 1 is not affected, and the display screen is not shifted. When a pinch out operation (a screen is pushed by two fingers, and the fingers are spread and distanced) is performed, the auxiliary information display means 5 judges whether an expansion scaling factor of the display screen 21, which is currently displayed on the auxiliary information display terminal 2, is a predetermined maximum value or is not the maximum value (step 4h). When the expansion scaling factor is reached to the maximum value, minute information items of devices, which are displayed in the display screen of the auxiliary information display terminal 2, are shifted to a screen in which the minute information items will be displayed (step 4i). In order to shift the screen, the auxiliary information display means 5 obtains the minute information items from the monitor and control information provision means 6 (step 4e). After that, the screen data is updated and displayed (step 4f and step 4c).

When the expansion scaling factor is not reached to the maximum value, the display screen is expanded (step 4j and FIG. 3). Each of the information obtaining operation, the screen data updating operation, and the displaying operation, which are required to update the display screen, are performed in the same flow. In addition, in this case, the display screen on the large display 1 is not affected, and the scaling factor of the display screen is not increased. When a pinch in operation (a screen is pushed by two fingers, and the fingers are closed so as to pick the screen) is performed, the auxiliary information display means 5 judges whether a reduction scaling factor of the display screen 21, which is currently displayed on the auxiliary information display terminal 2, is a predetermined minimum value or is not the minimum value (step 4k). When the reduction scaling factor is reached to the minimum value, the display screen is returned to the last screen at a minute level (step 4l). When the reduction scaling factor is not reached to the minimum value, the display screen is reduced (step 4m and FIG. 2). In addition, in this case, the display screen on the large display 1 is not affected, and the scaling factor of the display screen is not reduced. After that, the screen updating operation is repeated in accordance with the screen operation of the auxiliary information display terminal 2.

As described above, when the operator repeats the pinch out operation, and the monitor and control information provision means 6 maintains an information item, an information item at a more minute level can be obtained. On the other hand, when the operator performs the pinch in operation, the minute level is returned to the last information item, and when the operator continues the operation, the display screen is finally returned to the overall display screen of the large display 1 (FIG. 2). In addition, a screen shift on the auxiliary information display terminal 2 is independently performed with respect to a screen shift on the large display 1, so that the operator can freely display a required screen on the auxiliary information display terminal 2 without modifying the display screen on the large display 1.

As described above, in the plant monitor and control system according to Embodiment 1, when each of the operator uses the auxiliary information display terminal 2, the information item at a minute level, which cannot be obtained on the large display 1, can be obtained without modifying the display screen on the large display 1, in which the information item is shared by a plurality of operators. As a result, the accuracy of the plant monitor is improved, and the high reliability of the system can be maintained.

Embodiment 2

Figure 5:
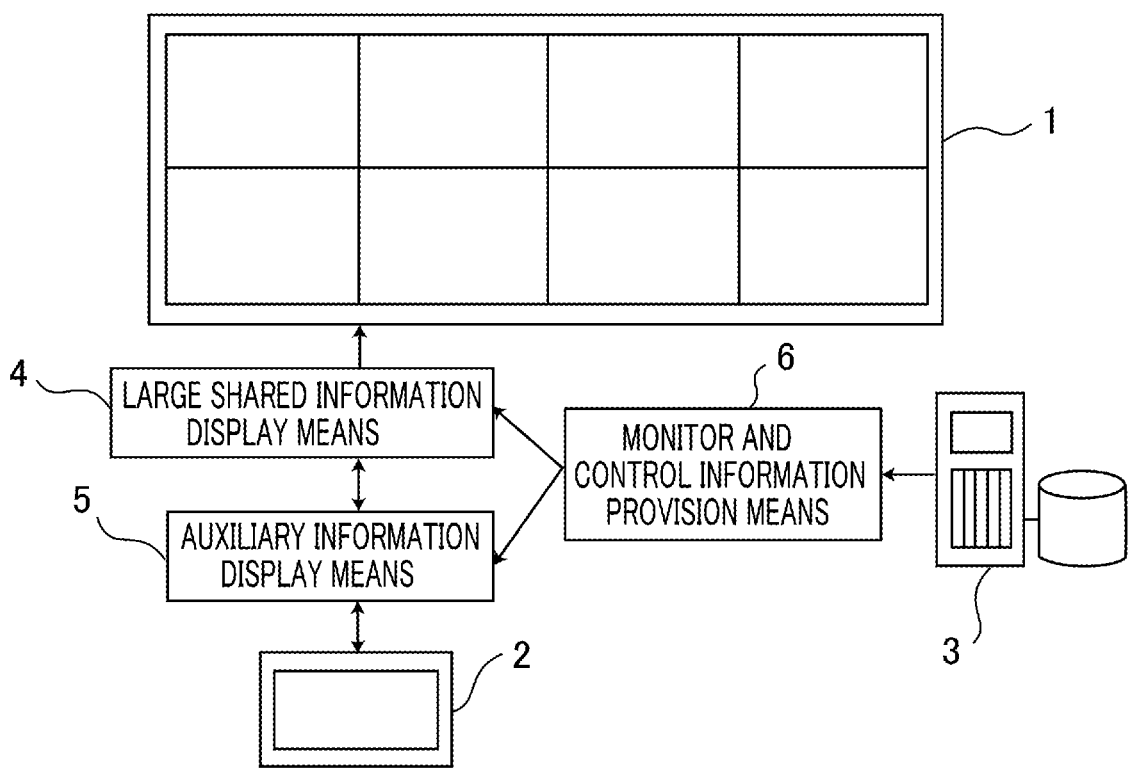
FIG. 5 is an overall schematic diagram illustrating a plant monitor and control system according to Embodiment 2.

A plant monitor and control system according to Embodiment 2 of the present invention will be explained in reference to FIG. 5, FIG. 6, and FIG. 7. FIG. 5 is an overall schematic diagram illustrating the plant monitor and control system according to Embodiment 2. In addition, reference symbols, which are the same as those in each of Figures in the drawings, refer to the same or equivalent parts, and explanations are omitted. In Embodiment 1, the information items between the large shared information display means 4 and the auxiliary information display means 5 are transmitted in one way from the large shared information display means 4 to the auxiliary information display means 5. However, in Embodiment 2, the information items are transmitted in two ways as illustrated in FIG. 5.

Figure 6:
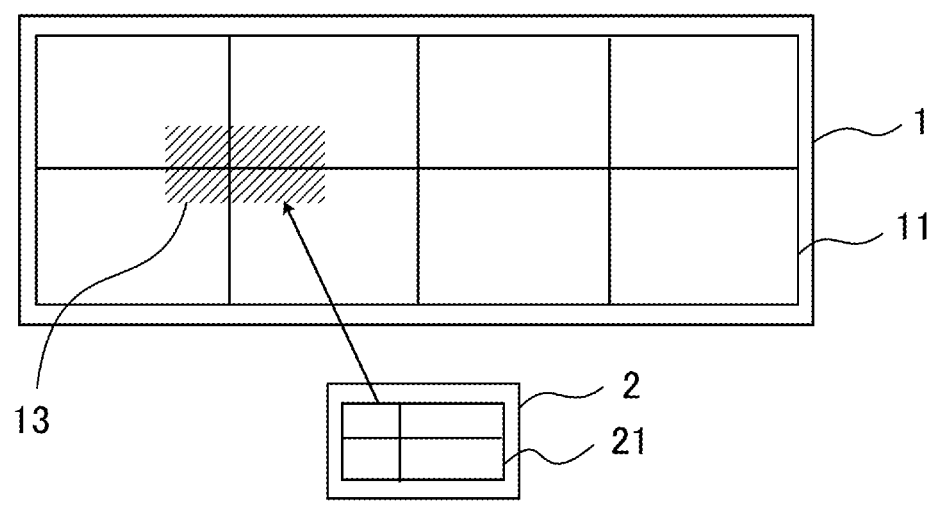
FIG. 6 is a diagram illustrating a relation between a display screen of a large display and a display screen of an auxiliary information display terminal according to Embodiment 2.

FIG. 6 is a diagram illustrating a relation between a display screen of a large display 1 and a display screen of an auxiliary information display terminal 2 according to Embodiment 2. An area 13 in FIG. 6, which is corresponded to the display screen displayed on the auxiliary information display terminal 2, is displayed on a corresponding area on the display screen of the large display 1. In addition, although a rectangular shape is used for displaying the area in this example, when a shape, by which a specific area can be displayed, is used, the shape is not limited. In the plant monitor and control system according to Embodiment 2, the area is displayed, whereby a plant area, which is monitored and controlled by each of the operators, can be informed to the other operator.

Figure 7:
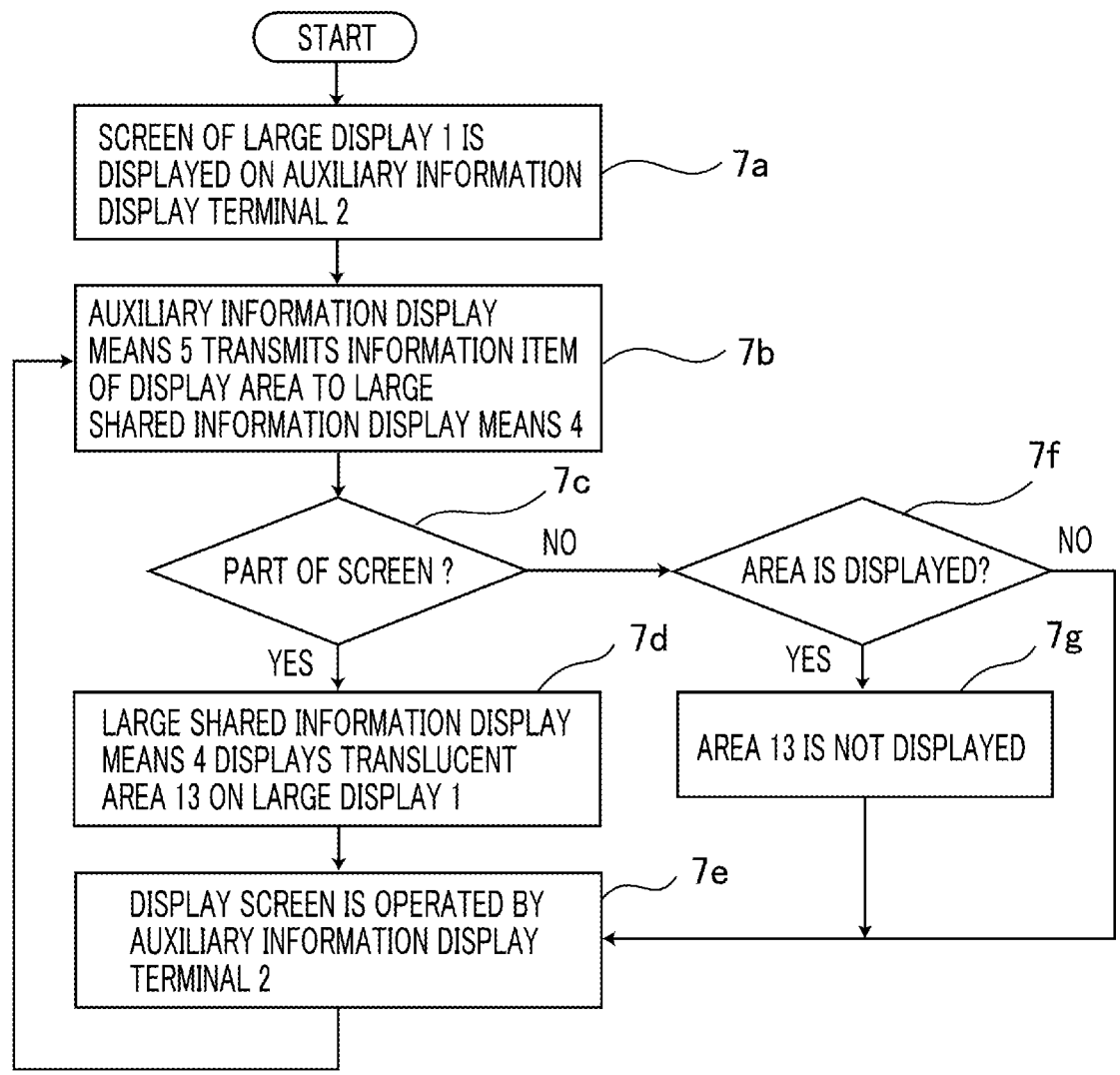
FIG. 7 is a flowchart for explaining an operation of the plant monitor and control system according to Embodiment 2.

FIG. 7 is a flowchart for explaining an operation of the plant monitor and control system according to Embodiment 2. When the display screen of the large display 1 is displayed on the auxiliary information display terminal 2 (step 7a), an auxiliary information display means 5 transmits the area information item corresponding to the display screen, which is displayed on the auxiliary information display terminal 2, to a large shared information display means 4 as an input item (step 7b). The large shared information display means 4 judges, by using the obtained area information item, whether the area, which is displayed on the auxiliary information display terminal 2, is a partial screen or an overall screen of the display screen of the large display 1 (step 7c). When the display area is the partial screen, the area is displayed on the display screen of the large display 1 by using the translucent area 13 (step 7d).

After that, when the operator operates the display screen by the auxiliary information display terminal 2 (step 7e), the information item of the display area is transmitted to the large shared information display means 4 (step 7b), and the area 13 on the display screen of the large display 1 is updated in accordance with the information item of the display area (step 7d). In other words, the large shared information display means 4 shifts or modifies the area 13 in accordance with the shift operation, the expansion operation, or the reduction operation of the display area on the auxiliary information display terminal 2.

In addition, when the overall display screen of the large display 1 is displayed on the auxiliary information display terminal 2, the area 13 is not displayed (step 7f and step 7g). However, the minute level for display or non-display of the area 13 can be modified by previously setting the minute level. When the information item, which is displayed on the auxiliary information display terminal 2, is the information item of which level is a more minute level than the information item, which is displayed on the large display 1, the display area, which is a base point of the minute information item, of the large display 1 is displayed by using the area 13.

In addition, in the area 13 in which the display area of the auxiliary information display terminal 2 is displayed, a color-coded area can be displayed with respect to each of the operators, and when a plurality of operators monitors the screen, the display area, which is monitored by the each of the operators, can be discriminated. Moreover, in the area 13 in which the display area of the auxiliary information display terminal 2 is displayed, a plurality of areas can be integrated and displayed, and when one operator monitors a plurality of screens, each of the portions, which is monitored by the operator, can be grasped as the area. Moreover, because the overall screen of the large display 1 can be displayed on the auxiliary information display terminal 2, when the overall screen of the large display 1 is displayed on the auxiliary information display terminal 2, the monitor area of the each of the operators can be grasped on the auxiliary information display terminal 2.

As described above, in the plant monitor and control system according to Embodiment 2, when the area is displayed on the large display 1, the plant portion, which is monitored and operated by the each of the operators, can be shared as the area between the other operator and a supervisor. Thereby, the monitor area of the each of the operators can be intuitively grasped. As a result, a cooperation work of the operator and a suitable operation instruction of the supervisor can be performed, and a plant monitor work can be effectively performed. Moreover, in the plant monitor and control system according to Embodiment 2, the monitor area of the each of the operators is displayed on the large display 1 by using the translucent area 13, so that the display contents of the large display 1 are not blocked. Moreover, it is not feared that a misidentification of a plant condition, which is caused by a highlight display or the like of the corresponding device, is caused, and an operation mistake of the operator can be reduced.

Embodiment 3

Figure 8:
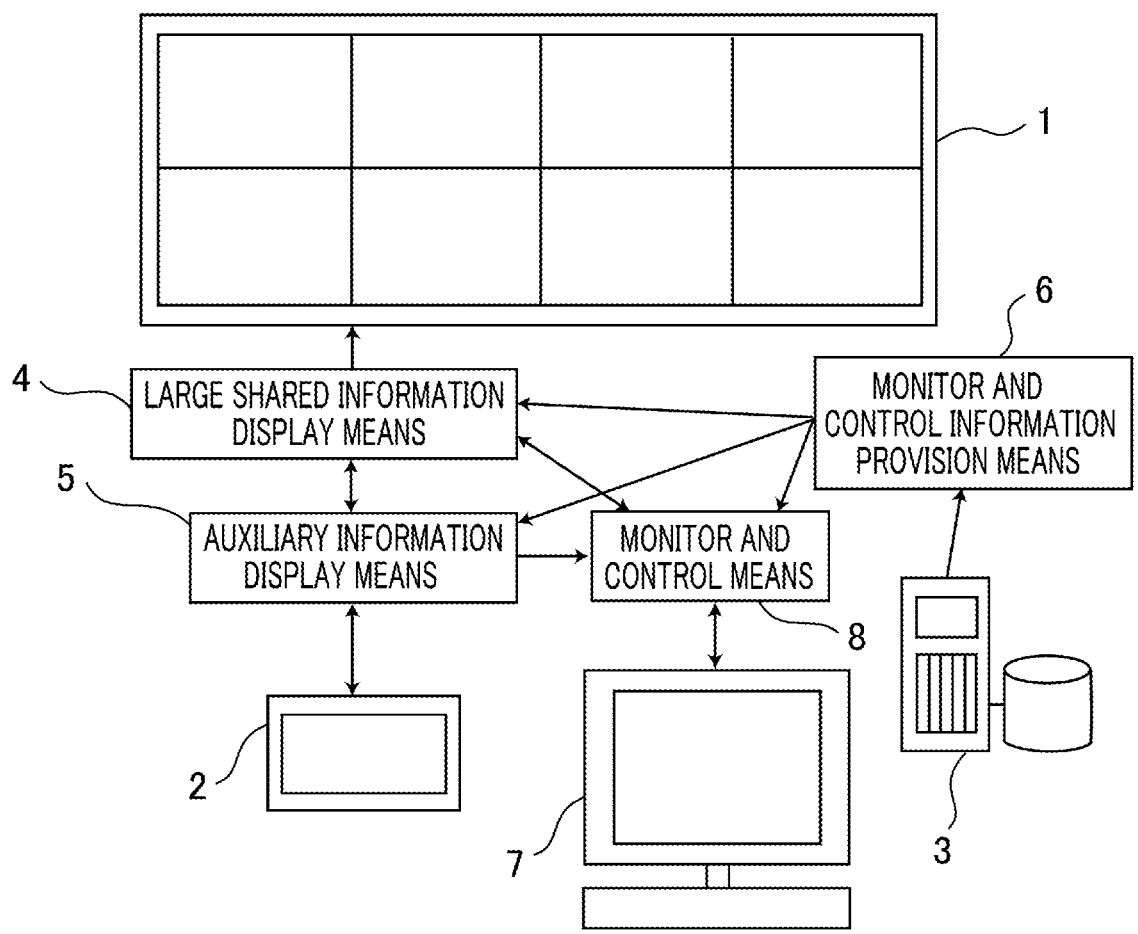
FIG. 8 is an overall schematic diagram illustrating a plant monitor and control system according to Embodiment 3.

A plant monitor and control system according to Embodiment 3 of the present invention will be explained in reference to FIG. 8 and FIG. 9. FIG. 8 is an overall schematic diagram illustrating the plant monitor and control system according to Embodiment 3. In Embodiment 3, a monitor and control terminal 7, by which a plant operation is respectively performed by each of the operators, and a monitor and control means 8, by which a plant monitor and control information item is displayed on the monitor and control terminal 7 and a device is operated, are added to a configuration of the plant monitor and control system according to Embodiment 2.

In addition, in this case, although the plant monitor and control system has a configuration in which a data server 3 holds the plant monitor and control information item and each of the terminals obtains the plant monitor and control information item from a monitor and control information provision means 6, the plant monitor and control system may have a configuration in which the monitor and control terminal 7 holds the plant monitor and control information item. In Embodiment 3, the plant monitor and control system is configured in such a way that the information item is transmitted from an auxiliary information display means 5 to the monitor and control means 8, whereby a screen of the monitor and control terminal 7 can be switched by an operation of an auxiliary information display terminal 2.

Figure 9:
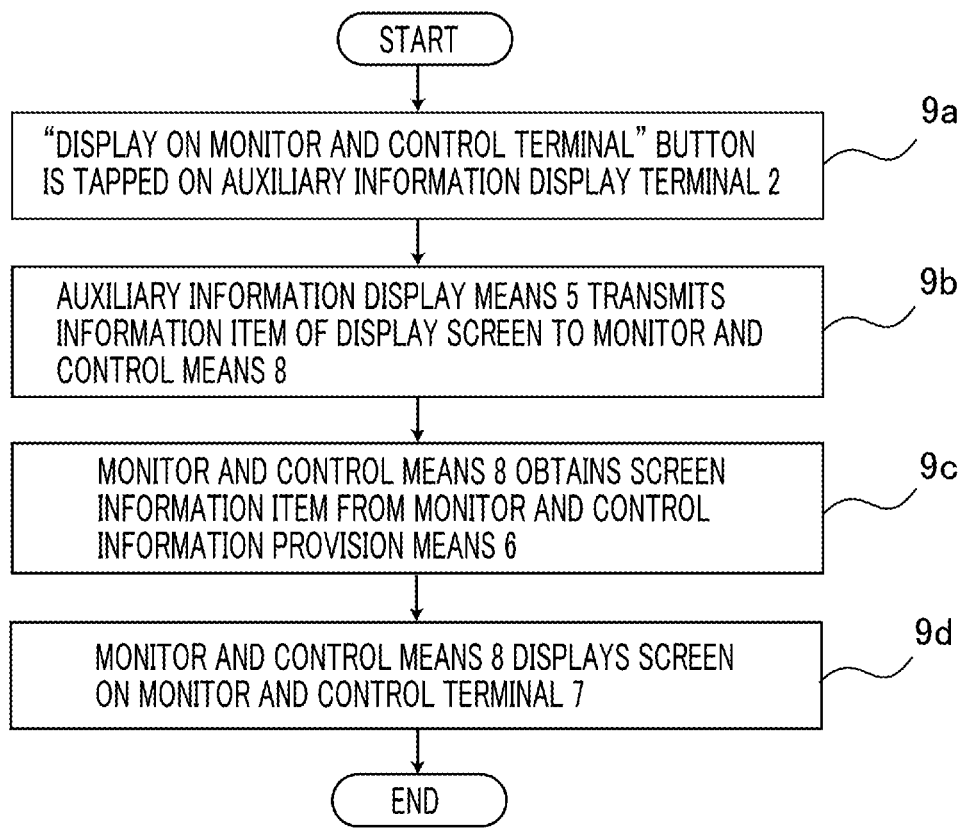
FIG. 9 is a flowchart for explaining an operation of the plant monitor and control system according to Embodiment 3.

In Embodiment 3, an operation, which is indicated by a flowchart in FIG. 9, is further added to the operation of the plant monitor and control system according to Embodiment 1. A screen of a large display 1 or the plant monitor and control information item, which is obtained from the data server 3 by the monitor and control information provision means 6, is displayed on the monitor and control terminal 7. When it is required that the plant monitor and control information item (screen), which is monitored by the auxiliary information display terminal 2, is operated by the monitor and control terminal 7, the operator taps an item of a menu button, such as "display on monitor and control terminal", which is required for displaying the plant monitor and control information item by the monitor and control terminal 7, on the screen of the auxiliary information display terminal 2 (step 9*a*).

When the item is selected, the auxiliary information display means 5 transmits the plant monitor and control information item (screen), which is currently displayed on the auxiliary information display terminal 2, to the monitor and control means 8 as an input information item (step 9*b*). The monitor and control means 8 obtains a screen information item from the monitor and control information provision means 6 in accordance with the input information item (step 9*c*). After that, the monitor and control means 8 displays the corresponding screen on the monitor and control terminal 7 (step 9*d*). After the screen display operation is terminated, the operator can operate with respect to the display screen on the monitor and control terminal 7.

As described above, in the plant monitor and control system according to Embodiment 3, after the operation for obtaining a required screen is performed on the auxiliary information display terminal 2, the plant monitor and control information item (screen), which is required to be displayed on the monitor and control terminal 7, can be directly displayed by the auxiliary information display terminal 2, so that a complicated operation, which is performed by the operator in order to obtain the required screen on the monitor and control terminal 7, becomes unnecessary. Thereby, a smooth work shift can be performed, and the operation can be effectively performed.

Moreover, in the plant monitor and control system according to Embodiment 3, the auxiliary information display terminal 2 for monitoring and the monitor and control terminal 7 for operating the plant are respectively provided, whereby the operation including a screen switch operation of the large display 1 is performed on the monitor and control terminal 7, and the other operations can be divided so as to be performed on the auxiliary information display terminal 2. Thereby, unnecessary screen switch operations of the large display 1 are reduced, so that the operator can focus attention on the display screen, and the reliability of the plant monitor operation can be improved.

Embodiment 4

Figure 10:
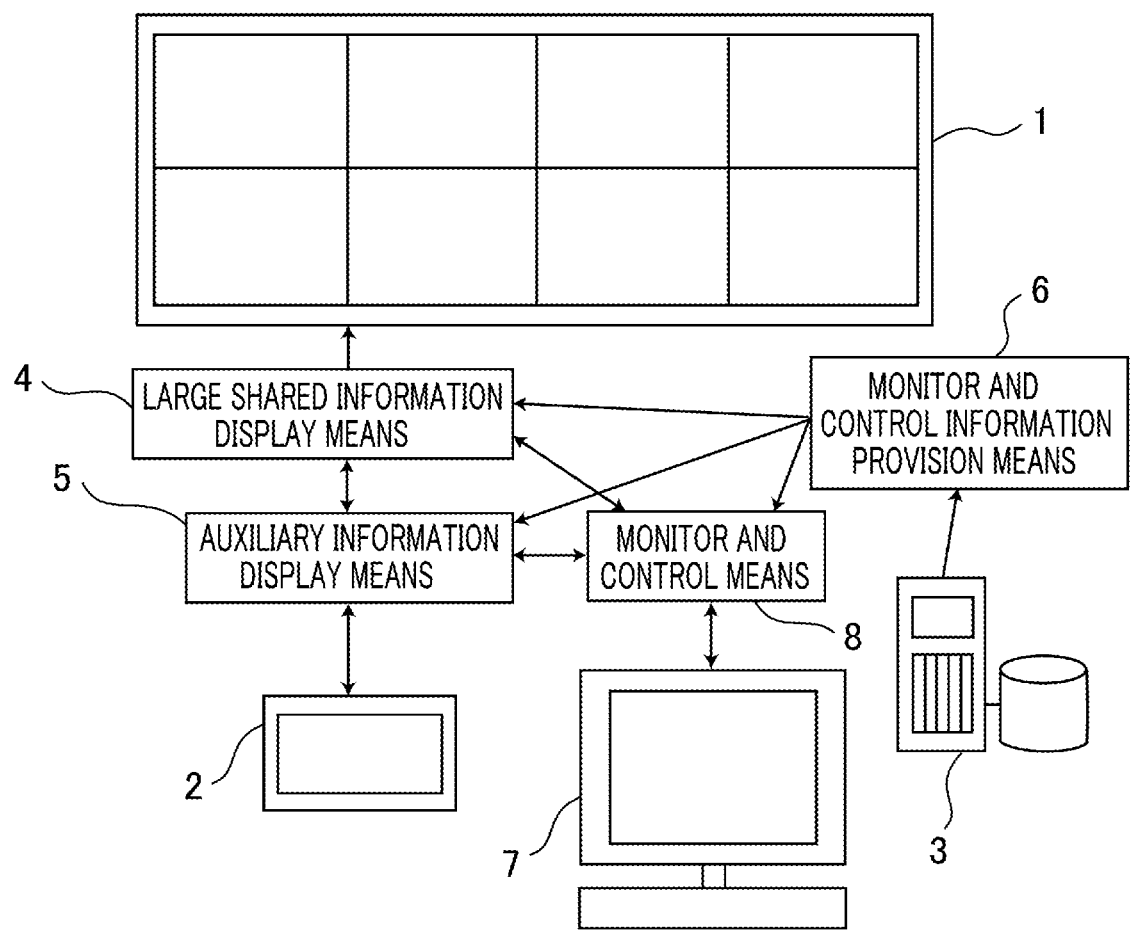
FIG. 10 is an overall schematic diagram illustrating a plant monitor and control system according to Embodiment 4.

A plant monitor and control system according to Embodiment 4 of the present invention will be explained in reference to FIG. 10 and FIG. 11. FIG. 10 is an overall schematic diagram illustrating the plant monitor and control system according to Embodiment 4. In Embodiment 3, the information item between the auxiliary information display means 5 and the monitor and control means 8 is transmitted in one way from the auxiliary information display means 5 to the monitor and control means 8. However, in Embodiment 4, the information item is transmitted in two ways as illustrated in FIG. 10. As described above, the plant monitor and control system is configured in such a way that the information item is transmitted from a monitor and control means 8 to an auxiliary information display means 5, whereby a screen of an auxiliary information display terminal 2 can be switched by an operation of a monitor and control terminal 7.

Figure 11:
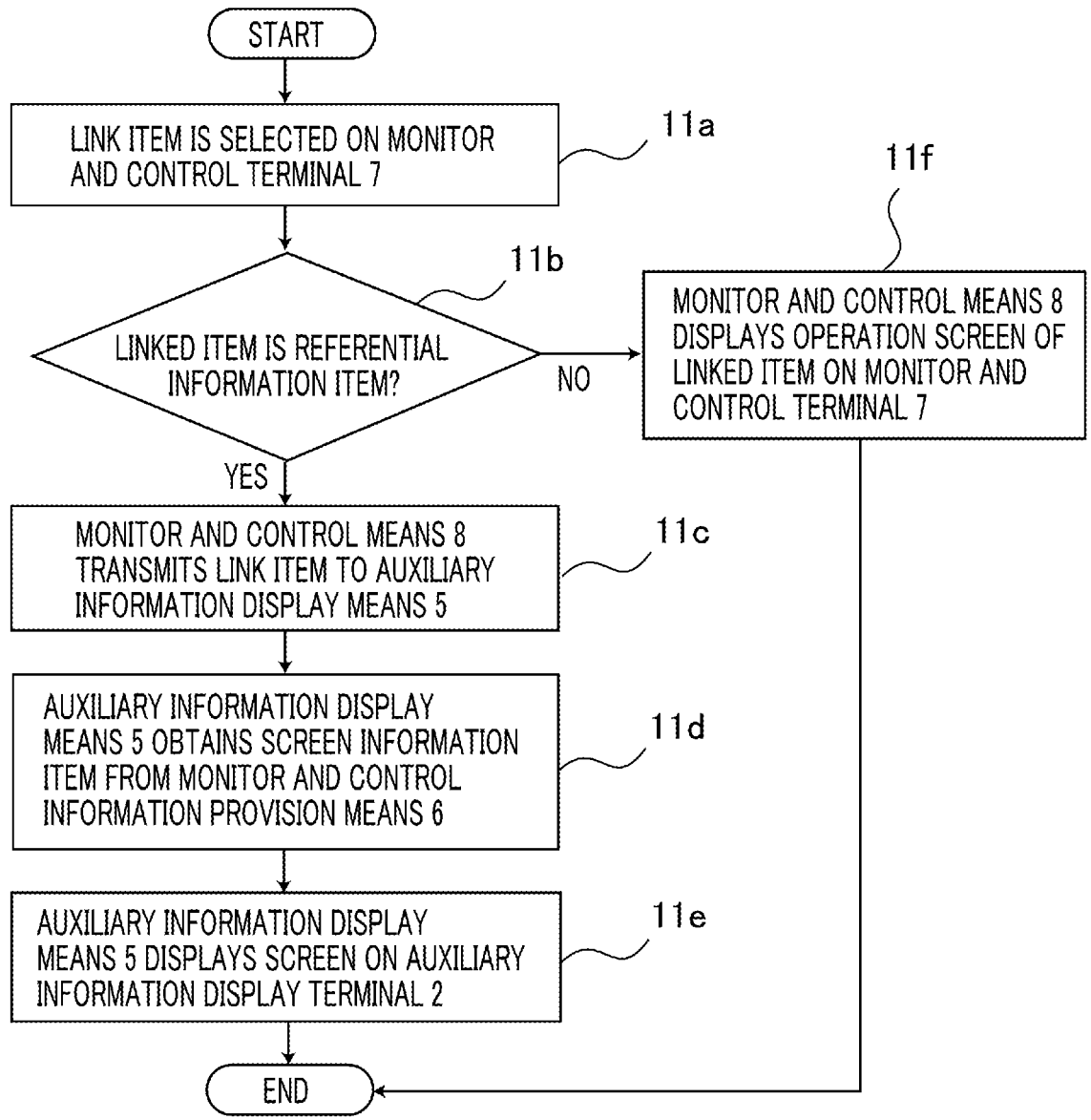
FIG. 11 is a flowchart for explaining an operation of the plant monitor and control system according to Embodiment 4.

FIG. 11 is a flowchart for explaining an operation of the plant monitor and control system according to Embodiment 4. A plant operation information item (screen), which is obtained from a data server 3 by a monitor and control information provision means 6, is displayed on the monitor and control terminal 7. In addition, the plant operation information item is a part of plant monitor and control information items. In order to display a referential information item (plant operation information item) which is required when an operation is performed, an operator selects the referential information item, for example, a calculation state of a control device or a link item for an operation manual, which is displayed on a screen of the monitor and control terminal 7 (step 11*a*). The monitor and control means 8 judges whether the linked item of the selected item is a predetermined referential information item or is not the predetermined referential information item (step 11*b*), and when the linked item is the referential information item, the monitor and control means 8 transmits the selected item to the auxiliary information display means 5 as an input item (step 11*c*).

The auxiliary information display means 5 obtains a screen information item, which is required for displaying the inputted item, from the monitor and control information provision means 6 (step 11*d*), and displays the screen information item on the auxiliary information display terminal 2 (step 11*e*). When the link item, which is selected on the screen of the monitor and control terminal 7, is linked to the operation screen, the corresponding screen is displayed on the monitor and control terminal 7 (step 11*f*).

In addition, when the operation information item is always transmitted between the monitor and control terminal 7 and the auxiliary information display terminal 2 except for displaying the referential information item on the auxiliary information display terminal 2 by selecting the link item, it is possible that a required referential information item is estimated in accordance with an operation of the operator on the monitor and control terminal 7, and the required referential information item is automatically displayed on the auxiliary information display terminal 2.

As described above, in the plant monitor and control system according to Embodiment 4, the referential information item, which is required when the operation is performed, can be displayed on the auxiliary information display terminal 2. Thereby, only a screen, which is required for the operation, is displayed on the monitor and control terminal 7, and the information item, which is required when the operation is performed, is not blocked by the other screen, so that a misidentification or an operation mistake of the operator can be reduced.

Embodiment 5

Figure 12:
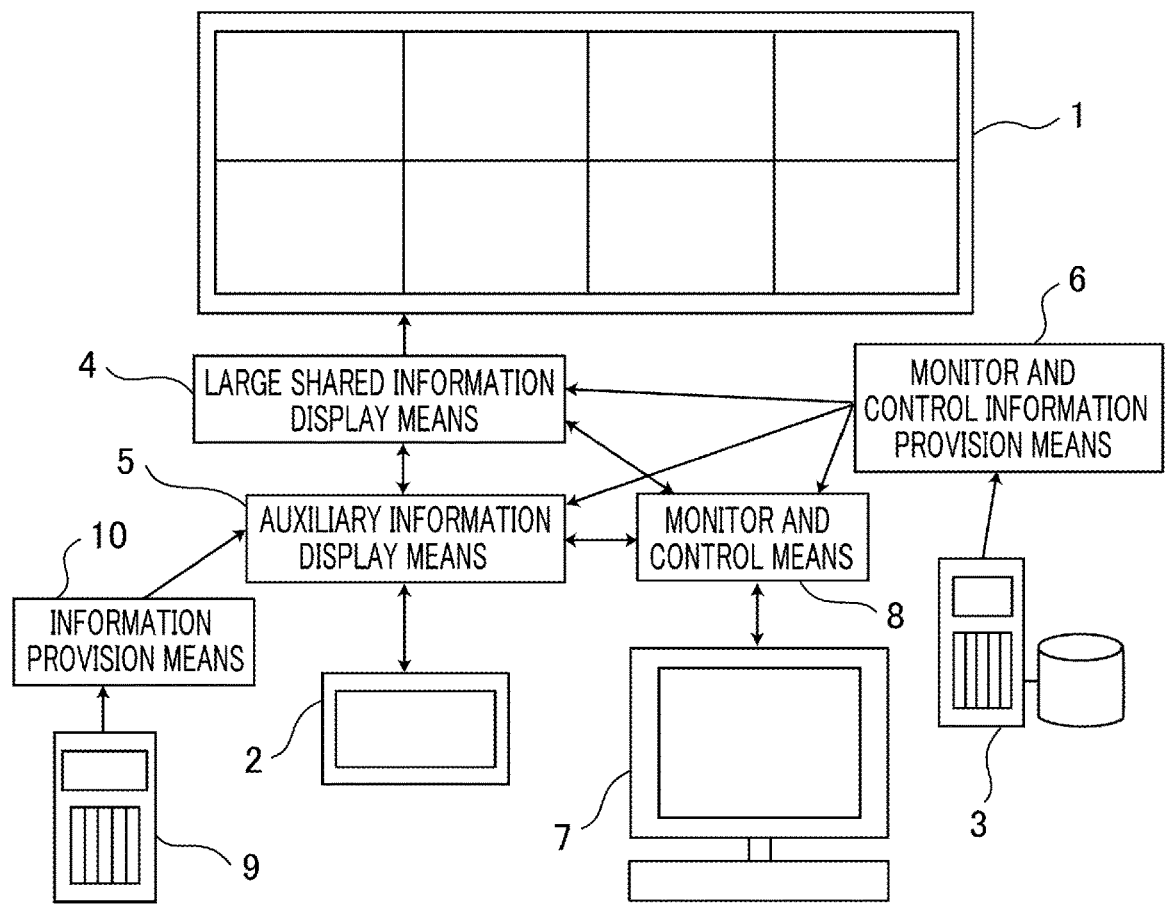
FIG. 12 is an overall schematic diagram illustrating a plant monitor and control system according to Embodiment 5.

A plant monitor and control system according to Embodiment 5 of the present invention will be explained in reference to FIG. 12, FIG. 13, and FIG. 14. FIG. 12 is an overall schematic diagram illustrating the plant monitor and control system according to Embodiment 5. In Embodiment 5, in order to access information systems in the inside and the outside of a plant, an information provision device 9 and an information provision means 10 are added to the configuration of the plant monitor and control system according to Embodiment 3 and Embodiment 4. The information provision device 9 is a data server by which information items in the plant are stored. Thereby, a Web browser or the like, which is installed in an auxiliary information display terminal 2, is used, whereby an external information item, such as an equipment inspection schedule which is provided in the information system in the inside of the plant, can be accessed.

Figure 13:
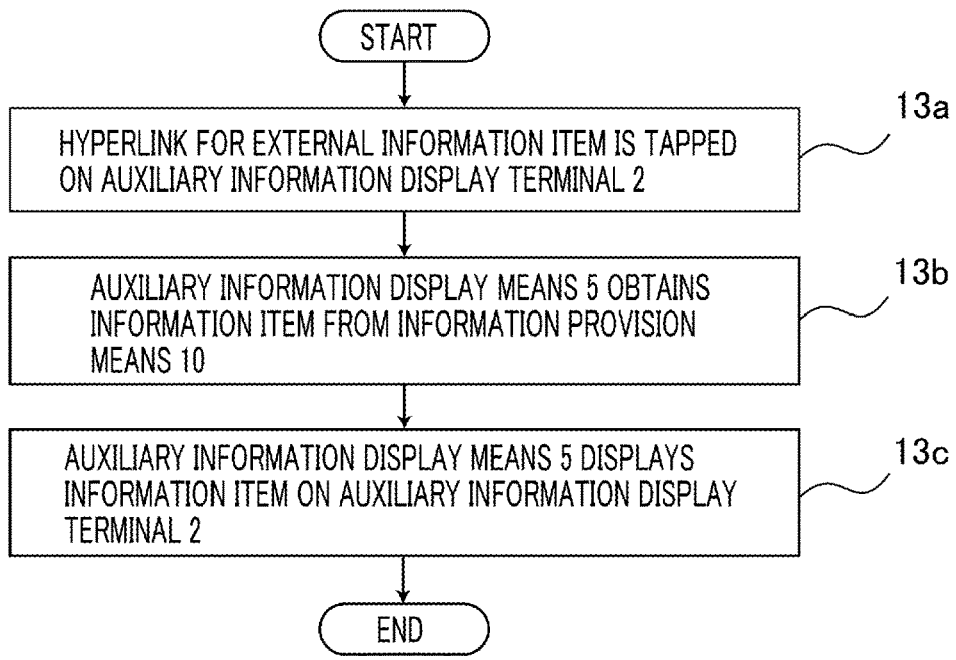
FIG. 13 is a flowchart for explaining an operation, in which an auxiliary information display terminal is operated, according to Embodiment 5.

FIG. 13 is a flowchart for explaining an operation in which the external information item is accessed from the auxiliary information display terminal 2. When an operator taps a hyperlink for the external information item, such as an operation manual, on a display screen of the auxiliary information display terminal 2 (step 13*a*), an auxiliary information display means 5 obtains a corresponding information item from a linked item via the information provision means 10 (step 13*b*), and displays the obtained information item on the display screen of the auxiliary information display terminal 2 (step 13*c*).

Figure 14:
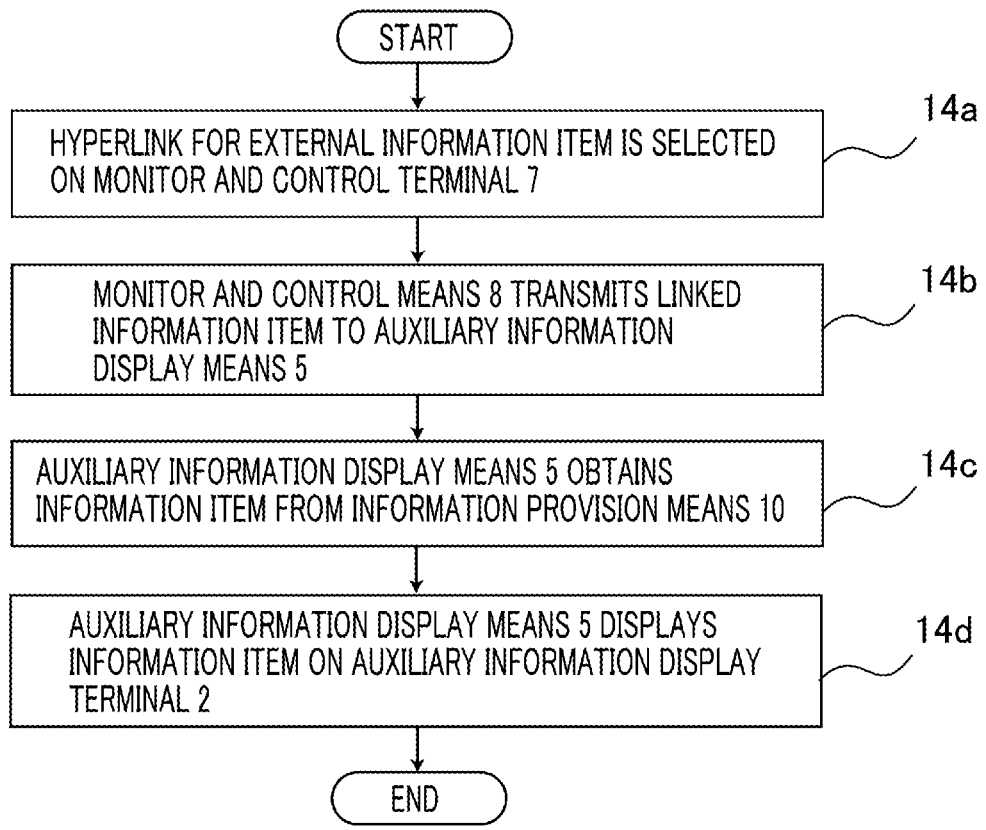
FIG. 14 is a flowchart for explaining an operation, in which a monitor and control terminal is operated, according to Embodiment 5.

FIG. 14 is a flowchart for explaining an operation in which the external information item is accessed from a monitor and control terminal 7. When the operator selects the hyperlink for the external information item on a display screen of the monitor and control terminal 7 (step 14*a*), a monitor and control means 8 transmits the linked item, which is required to be displayed on the auxiliary information display terminal 2, to the auxiliary information display means 5 as an input item (step 14*b*). In the following operation which is similar to the operations in (step 13*b*) and (step 13*c*) in FIG. 13, the auxiliary information display means 5 obtains the corresponding information item from the linked item via the information provision means 10 (step 14*c*), and displays the obtained information item on the display screen of the auxiliary information display terminal 2 (step 14*d*).

As described above, in the plant monitor and control system according to Embodiment 5, the external information item can be referred by using the auxiliary information display terminal 2. Thereby, the information item, which cannot be accessed by the monitor and control terminal 7 from a viewpoint of security, can be easily accessed, and a complicated work, such as a work for investigating a paper document, can be reduced. As a result, a monitor work, an operation work, and a maintenance work for a plant can be effectively performed.

In addition, in the scope of the present invention, it is possible that each of embodiments is freely combined, or each of embodiments is suitably modified or omitted.

What is claimed is:

1. A plant monitor and control system comprising:
   a large display configured to display plant monitor and control information items;
   a navigation display terminal configured to accept a touch input operation;
   a data server configured to store the plant monitor and control information items; and
   a processing circuit
      configured to communicate the plant monitor and control information items to the large display such that the plant monitor and control information items are shared by a plurality of operators;
      by which (i) the information items, which are displayed on the large display, are communicated to the navigation display terminal for display, and (ii) referential auxiliary information items, which are required for an operation, are displayed; and
      configured to communicate the plant monitor and control information items from the data server;
   wherein an overall display screen of the large display is displayed on the navigation display terminal, wherein when a drag operation is input on the navigation display terminal in a state in which the display screen of the large display is a base point, (i) the navigation display terminal shifts a display area thereof in order to update and display necessary information items from the display screen of the large display, and (ii) the display screen of the large display is neither affected nor shifted, and wherein when a pinch-out operation is input on the navigation display terminal, and it is judged that an expansion scaling factor of a display screen of the navigation display terminal has reached a predetermined maximum value, the display screen of the navigation display terminal is shifted to a screen in which minute information items of devices are displayed, without modifying the large display.

2. A plant monitor and control system as recited in claim 1, wherein an area information item corresponding to the display screen, which is displayed on the navigation display terminal, is transmitted from the processing circuit and is displayed on a corresponding area on the display screen of the large display.

3. A plant monitor and control system as recited in claim 2, wherein the corresponding area on the display screen of the large display is displayed by using a translucent area.

4. A plant monitor and control system as recited in claim 1, wherein a monitor and control terminal, by which a plant operation is performed, and the processing circuit, by which the plant monitor and control information items are displayed on the monitor and control terminal and the devices are operated, are further included, and the plant monitor and control information items, which are displayed on the navigation display terminal, are transmitted from the processing circuit so as to be displayed on the monitor and control terminal, and the devices are operated by the monitor and control terminal.

5. A plant monitor and control system as recited in claim 2, wherein a monitor and control terminal, by which a plant operation is performed, and the processing circuit, by which the plant monitor and control information items are displayed on the monitor and control terminal and the devices are operated, are further included, and the plant monitor and control information items, which are displayed on the navigation display terminal, are transmitted from the processing circuit so as to be displayed on the monitor and control terminal, and the devices are operated by the monitor and control terminal.

6. A plant monitor and control system as recited in claim 4, wherein a plant operation information item, which is displayed on the monitor and control terminal, is transmitted from the processing circuit so as to be displayed on the navigation display terminal.

7. A plant monitor and control system as recited in claim 5, wherein a plant operation information item, which is displayed on the monitor and control terminal, is transmitted from the processing circuit so as to be displayed on the navigation display terminal.

8. A plant monitor and control system as recited in claim 4, wherein the processing circuit, which accesses information systems in the inside and the outside of a plant, displays the information item on the navigation display terminal.

9. A plant monitor and control system as recited in claim 5, wherein the processing circuit, which accesses information systems in the inside and the outside of a plant, displays the information item on the navigation display terminal.

10. A plant monitor and control system as recited in claim 6, wherein the processing circuit, which accesses information systems in the inside and the outside of a plant, displays the information item on the navigation display terminal.

11. A plant monitor and control system as recited in claim 7, wherein the processing circuit, which accesses information systems in the inside and the outside of a plant, displays the information item on the navigation display terminal.

* * * * *